Figure 1:
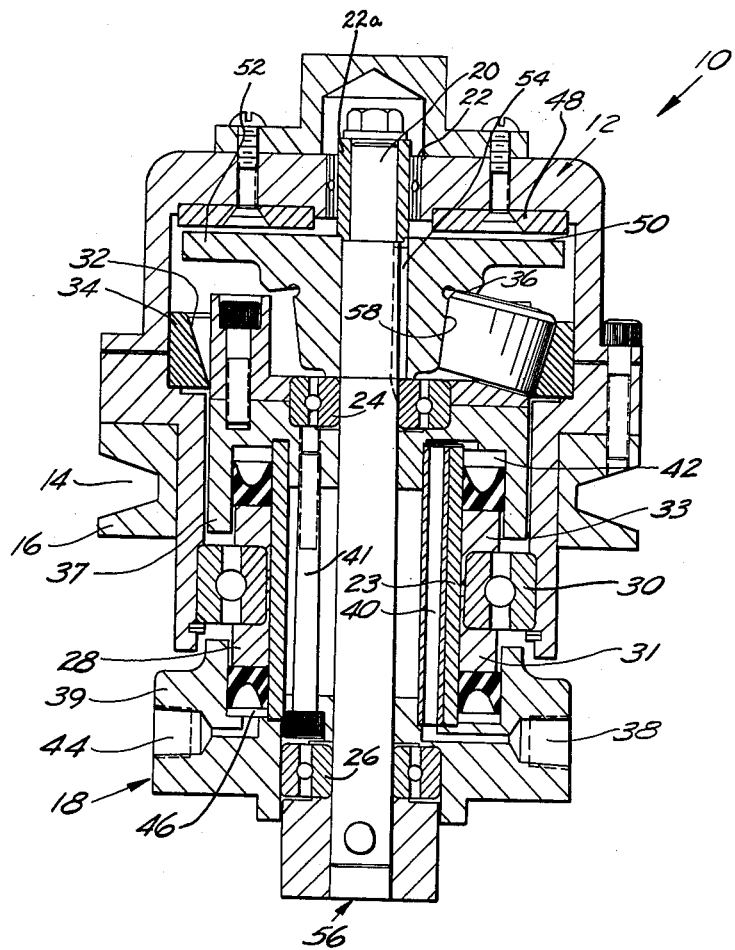

Feb. 26, 1963 G. S. MAHAN 3,078,735
TAPPING UNIT DRIVE HEAD
Filed June 9, 1961

INVENTOR.
GUY S. MAHAN
BY
ATTORNEYS

United States Patent Office 3,078,735
Patented Feb. 26, 1963

3,078,735
TAPPING UNIT DRIVE HEAD
Guy S. Mahan, Hudson, Ohio, assignor to International Basic Economy Corporation, New York, N.Y., a corporation of New York
Filed June 9, 1961, Ser. No. 116,170
3 Claims. (Cl. 74—205)

This invention concerns fluid-operated reversible drives, and more particularly a compact, effective, fluid-controlled reversible drive for machine tools such as a tapping head.

In many machine tools, the operation of the tool requires a forward motion of the tool coupled with a relatively slow rotation of the tool in one direction, followed by a retraction of the tool coupled with a relatively fast rotation in the opposite direction. In the past, this reversal of motion has been accomplished by mechanical gearing or other cumbersome devices which did not take full advantage of the possibilities of fluid power control. Consequently, previously known devices were always subject to the problem of mounting compact, inexpensive directional controls on multi-unit machines in which space was at a premium.

The present invention solves this problem by providing a drive head whose housing can be axially shifted with respect to its shaft by a very slight amount to change the path of internal force transmission and thus the direction of rotation of the shaft.

It is therefore the object of this invention to provide a compact, effective fluid-controlled motion reversing mechanism suitable for use on small machine tools.

It is another object of this invention to provide a fluid-operated motion reversing mechanism whose rotatable housing can be slightly axially shifted to transmit its rotation to the drive shaft either directly or through the intermediary of a motion-reversing roller bearing.

These and other objects of this invention will become apparent from a perusal of the following specification taken in connection with the accompanying drawings, in which the single FIGURE is a vertical cross section through the device of this invention.

Basically, the tapping head of this invention includes a piston housing partially enclosed by a rotatable drive housing. A drive shaft is rotatably journaled with respect to both housings. Input motion in a constant direction is applied to the drive housing, and the variable-direction output motion can be taken from the drive shaft. Reversal of the motion of the drive shaft is accomplished by pneumatically axially shifting the drive housing with respect to the piston housing. In one of its extreme positions, the drive housing directly engages a clutch disc mounted on the drive shaft, whereas in its other extreme position, the drive housing engages a bearing which in turn transmits its motion to the drive shaft.

Referring now to the drawing, the device of this invention is generally shown at 10. Rotational motion is supplied to the device by an appropriate V-belt (not shown) which engages the groove 14 of pulley 16 to rotate the drive housing 12 with respect to the piston housing 18. A drive shaft 20 is journaled for rotation both with respect to the drive housing 12 and with respect to the piston housing 18 by bearings 22, 24, and 26. The bearings 24 and 26 are fixed, i.e. they do not allow axial shifting of the drive shaft 20 with respect to the piston housing 18. The bearing 22, on the other hand, is slidable on sleeve 22A and permits axial movement of the drive housing 12 with respect to shaft 20.

The piston housing is formed of two end parts 37 and 39 separated by the sleeve 23 and connected together by the bolts 41 (only one shown). A port 38 is provided in the bottom of piston housing 18 and communicates through transfer tube 40 with the upper cylinder chamber 42. A port 44 is provided on the other side of the bottom of piston housing 18 and communicates with the lower cylinder chamber 46.

An annular sleeve-like piston 28 is axially slidably mounted around the piston sleeve 23 and supports the drive housing 12 through a ball bearing 30 which extends into the annular space between end parts 37 and 39 of piston housing 18. The piston 28 is constructed of two identical parts 31 and 33 mounted on each side of bearing 30 which is fixed to housing 12 so that axial motion of the piston 28 results in an axial shift of the housing 12.

In the illustration, the drive housing 12 is shown in its uppermost position. In this position, the face 32 of bearing race 34, which is part of the drive housing 12, engages the rollers 36 (only one shown) mounted in an appropriate roller cage fixed with respect to the piston housing 18. Rollers 36 also engage the face 58 of the clutch disc 52.

The inside of the top portion of drive housing 12 is provided with a clutch lining 48 which is adapted to engage the face 50 of clutch disc 52. The clutch disc 52 is keyed to the drive shaft 20 by a key 54. Appropriate key means 56 may be provided at the bottom of drive shaft 20 to engage, e.g., a tapping tool.

*Operation*

In the position of the device shown in the drawing, the force transmission within the device is as follows: looking at the top of the device and assuming that the pulley 16 is made to rotate in a clockwise direction, this clockwise rotation is transmitted to rollers 36 through face 32 of bearing race 34. This motion causes rollers 36 to also rotate in a clockwise direction, and this rotation of the rollers 36 is transmitted to clutch disc 52 through face 58. Clutch disc 52 is therefore caused to rotate in a counterclockwise direction, and this rotation is transmitted to shaft 20 through key 54. Thus, drive shaft 20 is caused to rotate in a counterclockwise direction.

If it is now desired to reverse the motion of drive shaft 20, compressed air is introduced into port 38, and air is exhausted through port 44. This causes piston 28 to move downwardly, carrying drive housing 12 with it through the bearings 30 and 22. Downward motion of the drive housing 12 causes face 32 of bearing race 34 to become disengaged from roller 36, and further downward movement of drive housing 12 brings the clutch lining 48 into contact with face 50 of clutch disc 52. In this condition, the clockwise rotation of pulley 16 and drive housing 12 is directly transmitted to drive shaft 20 through clutch disc 52. In this condition, therefore, drive shaft 20 rotates in a clockwise direction.

The relative angular velocity of drive shaft 20 with respect to drive housing 12 during the first-described condition may be readily varied by changing the ratio of the mean diameter of bearing face 32 ($d_b$) to that of clutch disc face 58 ($d_s$). Mathematically, $$W_s = W_b \frac{d_b}{d_s}$$

wherein $W_s$ is the angular velocity of the drive shaft, $W_b$ the angular velocity of the drive housing. In the last-described condition, the angular velocity of shaft 20 will be readily seen to be identical to that of bearing housing 12 ($W_s = W_b$). As a practical matter, the last-described or lower position of drive housing 12 is the one used for the working stroke of the tool, because this position represents the lower shaft speed, and because a higher shaft speed is desired for the withdrawal or retraction stroke.

To return the drive housing 12 to its upper position, the compressed air supply is merely reversed so that compressed air is supplied to port 44 and is exhausted from port 38.

This invention has the added safety feature of permitting slippage between the clutch face 50 and clutch plate 48. This slippage can be introduced by varying the fluid pressure on the piston and therefore the maximum torque that is transmitted by clutch face 50 and clutch plate 48 can be varied.

It will be seen that this invention provides a compact and effective motion reversing mechanism easily operable by compressed air or other fluid power. Due to the small number of its parts, all located within the rotatable housing, and the simplicity of its construction, the device of this invention is trouble-free and easy to maintain. Obviously, many modifications of the illustrative embodiments described herein are possible without departing from the spirit of the invention. Therefore, the scope of the invention is not to be limited by the illustration described herein, but only by the scope of the following claims.

I claim:

1. The tapping unit drive head comprising, a cylinder; a driven shaft rotatably journalled in said cylinder; a drive element secured to said driven shaft; a double acting piston disposed within said cylinder; a drive housing substantially encompassing said cylinder and rotatably mounted about said piston and driven shaft but secured to said piston for reciprocation therewith; said drive housing having means adapted to operatively engage and disengage said drive element depending upon the position of said piston and drive housing; means on said drive housing for providing rotation thereto; and means for selectively applying fluid on opposite sides of said piston for moving said piston and housing to either engage or disengage said drive element with said means on said drive housing whereby said driven shaft can be selectively driven by said drive housing.

2. The tapping unit drive head comprising, a cylinder; a driven shaft rotatably journalled in said cylinder; a spindle including a clutch plate and a first bearing race secured to said driven shaft; a double acting piston disposed within said cylinder; a drive housing substantially encompassing said cylinder and rotatably mounted about said piston and driven shaft but secured to said piston for reciprocation therewith; said drive housing having a clutch face opposing said clutch plate and a second bearing race spaced from said first bearing race; a rotatable bearing between said first and second bearing races; means on said drive housing for providing rotation thereto; and means for selectively applying fluid on opposite sides of said piston for moving said piston and housing to either operatively engage said clutch plate and clutch face or said bearing races with said bearing whereby said driven shaft can be selectively driven in either rotatable direction and at different speeds by said drive housing.

3. A tapping unit drive head comprising, a cylinder, a driven shaft rotatably journalled in said cylinder, a clutch member secured to said driven shaft, a bearing race secured to said shaft, a drive housing journalled on said driven shaft and having a clutch face opposing said clutch member, said housing having a bearing cup with a bearing race aligned with a bearing race on said shaft, roller bearings positioned between said bearing races; a double acting piston disposed within said cylinder, said piston being connected through a thrust bearing and shift ring to said housing; and means for applying fluid to opposite sides of said piston for moving said housing to engage said clutch face with said clutch member to rotate said shaft in one direction, and to move said housing in the opposite direction to disengage said clutch face from said clutch member and engage said bearings to rotate said shaft in the reverse direction.

References Cited in the file of this patent

UNITED STATES PATENTS

| 692,754 | Alsop | Feb. 4, 1902 |
| 901,172 | Holgan et al. | Oct. 13, 1908 |
| 2,911,839 | Peace | Nov. 10, 1959 |